United States Patent [19]

Bruene

[11] 3,902,019

[45] Aug. 26, 1975

[54] FM BROADCAST EXCITER APPARATUS

[75] Inventor: Warren B. Bruene, Dallas, Tex.

[73] Assignee: Rockwell International Corporation, El Segundo, Calif.

[22] Filed: June 14, 1974

[21] Appl. No.: 479,381

[52] U.S. Cl. .............. 179/15 BT; 325/148; 332/19; 332/21; 331/25; 331/23

[51] Int. Cl.[2] .............................................. H04H 5/00

[58] Field of Search................. 179/15 BT; 325/148; 331/18, 177, 19, 25, 23, 179; 332/19, 21

[56] References Cited

UNITED STATES PATENTS

| | | | |
|---|---|---|---|
| 3,259,856 | 7/1966 | Bott | 325/148 |
| 3,375,448 | 3/1968 | Newman et al. | 331/25 |
| 3,600,683 | 8/1971 | Martin | 325/184 |
| 3,753,141 | 8/1973 | Morrien et al. | 331/25 |
| 3,803,490 | 4/1974 | Velo et al. | 179/15 BT |
| 3,805,192 | 4/1974 | Wade | 331/25 |

*Primary Examiner*—Kathleen H. Claffy
*Assistant Examiner*—Thomas D'Amico
*Attorney, Agent, or Firm*—Bruce C. Lutz; Robert J. Crawford

[57] ABSTRACT

Apparatus for using a single frequency source for supplying the control frequencies for the carrier, the stereo pilot carrier and the suppressed carrier signals. This is accomplished by using a variable divider in a phase lock loop in a manner such that the entire circuit is digital in operation.

3 Claims, 1 Drawing Figure

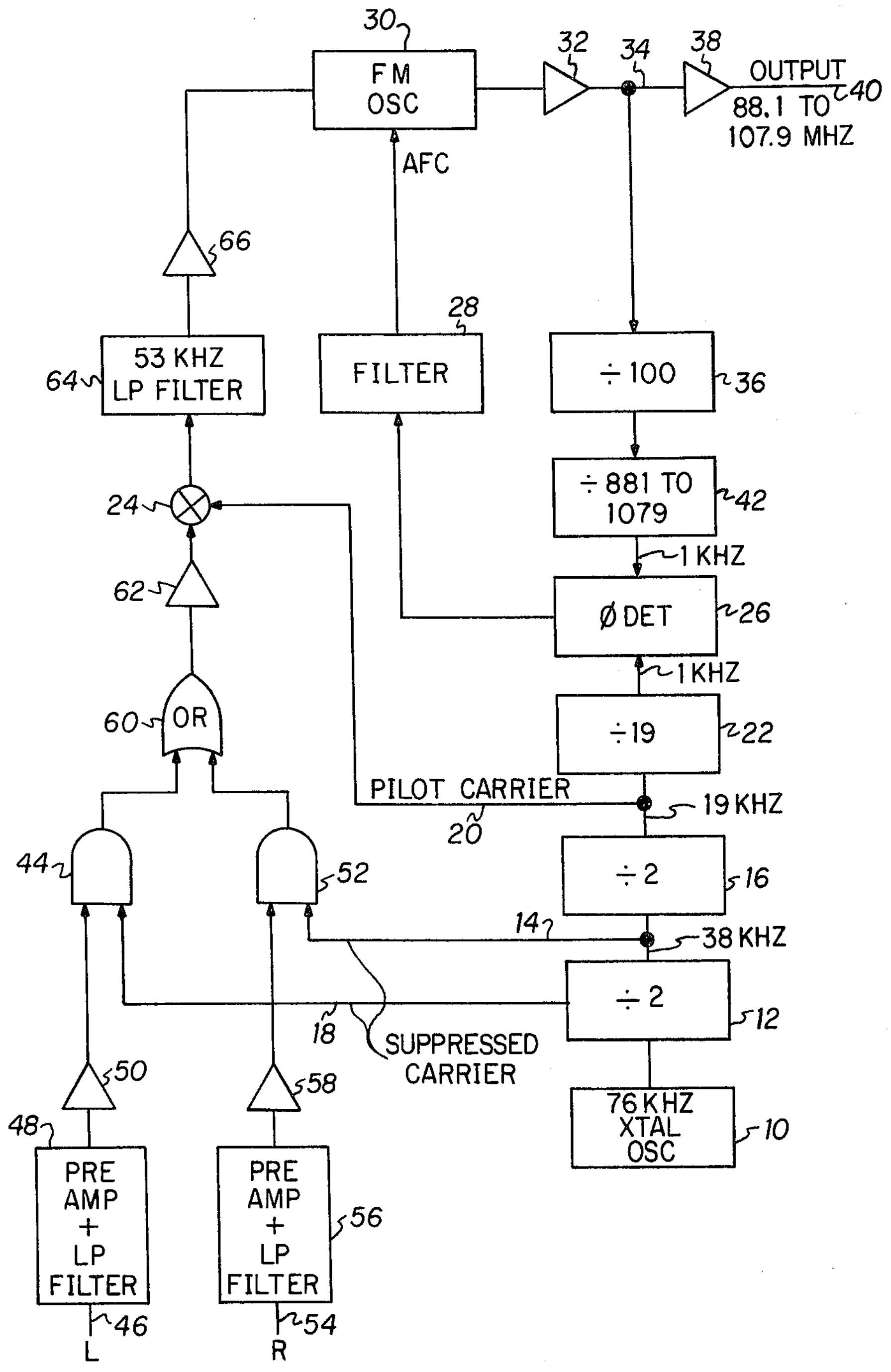
FM OSC
AFC
OUTPUT
88.1 TO 107.9 MHZ
53 KHZ LP FILTER
FILTER
÷100
÷881 TO 1079
1 KHZ
Ø DET
1 KHZ
÷19
PILOT CARRIER
19 KHZ
OR
÷2
38 KHZ
÷2
SUPPRESSED CARRIER
76 KHZ XTAL OSC
PRE AMP + LP FILTER
PRE AMP + LP FILTER
L
R

FM BROADCAST EXCITER APPARATUS

The present invention pertains generally to electronics and more specifically to frequency modulated transmitters. Even more specifically the present idea pertains to a method of and apparatus for using a single frequency source such as a crystal oscillator whose output is divided in a plurality of steps to provide the three frequency control signals for operating the various portions of the exciter section of an FM transmitter.

In the prior art two separate frequency sources were used for the base frequency carrier, the stereo pilot carrier and the suppressed carrier. More recently a single high frequency signal source has been used as a comparison against the output frequency from which a feedback signal in the form of an automatic frequency control signal can be used to correct the frequency of the base FM oscillator. The frequency of this source was determined by the desired operational frequency of the transmitter. A second but separate low frequency signal source has been used and divided in frequency to supply the signals for the suppressed carrier and the stereo pilot carrier.

The present invention recognizes the fact that if a given stable frequency source is divided to a low enough frequency and the output signal of an FM oscillator is divided to a low enough frequency, the slight amount of remaining deviation caused by frequency modulation will not affect the comparison of signals and thus the output of these compared signals can be used as the automatic frequency control signal. In practicing this inventive concept a "strapable" variable dividing device has been used in the phase lock feedback loop whereby the straps can be set at the factory for any one of the various frequencies used in the FM band. Thus, a given circuit can be manufactured for all frequencies of transmission by merely adjusting or reconnecting a few leads within the divider portion of the transmitter. This produces a standardization of parts and eliminates the previous requirements for a different high frequency comparison source for each operational frequency transmitter.

It is therefore an object of the present invention to provide an improved FM transmitter-exciter device;

Other objects and advantages of the present invention may be ascertained from a reading of the specification and appended claims in conjunction with the single figure showing a block diagram of the exciter section of an FM transmitter.

In the FIG. a crystal oscillator or other frequency source 10 is shown supplying signals to a divide by 2 network 12 whose primary output is supplied on a lead 14 to a further divide by 2 network 16. Divide by 2 block 12 also has a further output 18 which is 180 degrees out of phase with the output supplied on lead 14. Divide by 2 block 16 has an output 20 which is supplied to a divide by 19 block 22 as well as being supplied as a pilot carrier signal to an input of a mixer 24. The output of divide by 19 block 22 is supplied to a phase detection circuit 26 which supplies an output to a filter 28. Filter 28 supplies an automatic frequency control input to an FM oscillator 30. Oscillator 30 supplies its output through an isolation amplifier 32 to a lead 34 which is connected to an input of a divide by 100 block 36 as well as to an amplifier 38. Amplifier 38 has an output 40 which provides a signal to be transmitted which will vary from 88 to 108 mHz depending upon the division setting of a block 42 which is connected between divide by 100 block 36 and a further input to phase detector 26. As will be noted, blocks 22 and 42 supply outputs of 1 kHz when the system is operating. Any deviation from 1 kHz at the output of block 42 will create an error signal output from the phase detector block 26 and provide a feedback signal to FM oscillator 30 to correct its frequency and thereby return the output of block 42 to 1 kHz. Lead 18 from block 12 is supplied as one input to an AND gate 44. A left channel stereo signal 46 is supplied to a preamp and lowpass filter 48 whose output is supplied through an isolation amplifier 50 to a second input of AND gate 44. The lead 14 is connected to supply an input to an AND gate 52. A right channel stereo input signal is supplied on a lead 54 to a preamp and lowpass filter 56 whose output is supplied through an isolation amplifier 58 to a second input of AND gate 52. The outputs of AND gates 44 and 52 are supplied through an OR gate 60 and then through an isolation amplifier 62 to a second input of mixer 24. An output of mixer 24 is supplied through a 53 kHz lowpass filter 64 and an isolation amplifier 66 to an input FM oscillator 30.

While all of the blocks shown in the diagram are standard components available to anyone skilled in the art, it may be noted that block 42 is available from R. C. A. or can be assembled from several series connected units of standard integrated strappable circuits available from manufacturers of integrated circuits. A single device CD4059AD made by R. C. A. will also accomplish the dividing function. The phase detector 26 may be any of various types but one example of a device used in the inventive concept may be found in U.S. Pat. No. 3,588,732. The FM oscillator 30 is a frequency modulated oscillator which has an automatic frequency control input to adjust the carrier frequency. Suitable circuits are known to the art. An example of which is discussed in *Radio Engineers Handbook* by Terman published in 1943 by McGraw Hill.

Although from the above description of parts, etc. it is believed that anyone skilled in the art would immediately ascertain the operation of the inventive concept, a brief summation will be provided. In operation, the oscillator 10, in one embodiment of the invention, provides a 76 kHz output which after being divided by block 12 provides two, out of phase, 38 kHz signals to the AND gates 44 and 52. These signals operate as switches so that first the left channel is supplied through the OR gate 60, the AND gate 62, the filter 64 and the amplifier 66 to the oscillator 30 and then the right channel is supplied. These 38 kHz signals are called suppressed carriers because they tend to cancel out their effects and are not recovered until detected in the receiver. In other words, there is no 38 kHz component in the transmitted signal. This 38 kHz signal is divided again by divider 16 and used to produce a 19 kHz pilot carrier which is inserted into the signal and is used for recovery purposes of the suppressed carrier at the receiver end of the system. The 19 kHz signal is then divided by block 22 to provide a 1 kHz reference signal to the phase detector 26. As is well known to those skilled in the art, a phase detector is operable not only to provide an output upon a difference in phase but also to provide an output upon differences in frequency. This output is dependent in amplitude upon the phase and/or frequency of the two inputs but is normally limited as to the maximum amplitude output. The filter 28 filters out the approximately 1 kHz components and residual audio modulation sideband components leaving only a direct voltage signal to be applied to oscillator 30. If it be assumed that the oscillator 30 is to be frequency modulated around a carrier or base frequency of 101 mHz, the divider 36 would divide the signal by 100 and produce an output applied to block 42 of 1.01 mHz. For this frequency of operation, there would be internal strapping within block 42 to allow it to divide by 1,010 times. Thus, the output would be 1 kHz. The same operation would be applied to block 42 for any other desired frequency of operation. Since the signal being divided by block 36 and 42 is frequency modulated and in other words varies up to 75 kHz on either side of the carrier frequency of 101 mHz, there will be some residual deviation in the 1 kHz output signal from block 42. However, the deviation of the output 1 kHz signal from block 42 will be less than one hertz. The phase detector 26 output therefore contains a very small amount of modulation which is substantially all removed by low pass filter 28.

While I have described a specific embodiment utilizing specific frequencies for the purposes of illustration, I do not wish to be limited to this specific embodiment or the specific frequencies shown. For example the phase detector 26 could be operated at 4 kHz by using divide by 25 in block 36 and connecting the input of divide by 19 block 22 to the output of the 76 kHz crystal oscillator block 10. Also the frequency of crystal oscillator 10 may be any integer multiple of 38 kHz by dividing by that integer in block 12. Rather, I wish to be limited only to the concept of using a single frequency source to supply the three signals of base carriers, stereo pilot carrier and stereo suppressed carrier from a single source in a frequency modulated transmitter-exciter section as claimed in the appended claims.

I claim:

1. FM transmitter apparatus using only a single crystal oscillator comprising, in combination:

reference frequency oscillator means;

phase detection means, including first and second input means and output means, for providing an output signal indicative in sign and amplitude of the difference in phase and frequency of signals applied to the input means thereof;

first frequency dividing means, connected between said reference frequency oscillator means and said first input means of said phase detection means, for providing to said phase detection means a stable signal of a predetermined reference frequency lower than the frequency of said reference oscillator means;

FM transmitter means including baseband modulation input means and carrier frequency control input means, and output means thereof having a carrier frequency in accordance with signals applied to said frequency control input means which carrier frequency is modulated by signals applied to said baseband input means;

means connecting said input means of said phase detection means to said carrier frequency control input means;

adjustable second frequency dividing means, connected between said output means of said FM transmitter oscillator means and said second input means of said phase detector means, the adjustment of said second frequency dividing means providing a comparison signal of said predetermined reference frequency when the transmitter oscillator is operating at a specified frequency; and stereo means connected between said first frequency dividing means and said baseband input means of said FM transmitter oscillator means, for multiplexing first and second stereo signals, in accordance with a subharmonic of the signal divided by said first frequency dividing means, to be applied to the FM transmitter.

2. Apparatus for frequency stabilizing an FM modulated oscillator and for operating multiplex switching signals and suppressed carrier signals used in conjunction with modulating said oscillator from a single reference frequency source comprising, in combination:

first means for supplying a reference frequency signal;

second means, connected to said first means, for dividing the reference frequency signal to provide outputs of suppressed carrier switching signals, pilot carrier signals and carrier phase lock loop reference signals;

frequency modulated oscillator means, including modulating signal and control signal input means and output means, for providing a frequency modulated output signal having a carrier signal of a frequency determined by the signal supplied to said control signal input means thereof, third means, connected to said output means of said oscillator means, for dividing the frequency of signal generated by said oscillator means by a settable ratio in accordance with the desired frequency of operation of said oscillator means; and fourth means, connected to said oscillator means, said second means and said third means, for supplying a control signal to said oscillator means in accordance with the frequency difference between received frequency divided signals to form a phase locked loop.

3. FM transmitter apparatus using only a single crystal oscillator comprising, in combination:

reference frequency oscillator means;

phase detection means, including first and second input means and output means, for providing an output signal indicative in sign and amplitude of the difference in phase and frequency of signals applied to the input means thereof;

first frequency dividing means, connected between said reference frequency oscillator means and said first input means of said phase detector means, for providing to said phase detector means a stable signal of a predetermined reference frequency lower than the frequency of said reference oscillator means, said first frequency dividing means including pilot carrier and suppressed carrier frequency signal output means, the frequency of the pilot carrier and suppressed carrier being subharmonics of the pilot frequency of said reference frequency oscillator means;

FM transmitter oscillator means including baseband modulation input means and carrier frequency control input means, and output means thereof having a carrier frequency in accordance with signals applied to said frequency control input means which carrier frequency is modulated by signals applied to said baseband input means;

means connecting said output means of said phase detection means to said carrier frequency control input means; and adjustable second frequency dividing means, connected between said output means of said FM transmitter oscillator means and said second input means of said phase detector means, the adjustment of said second frequency dividing means providing a comparison signal of said predetermined reference frequency when the transmitter oscillator is operating at a specified frequency.

* * * * *